United States Patent Office 2,830,963
Patented Apr. 15, 1958

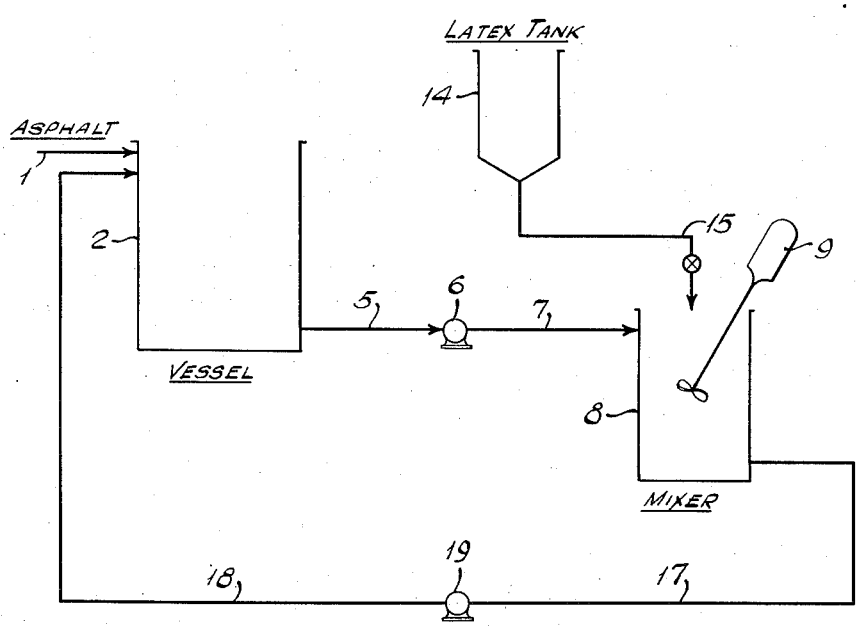

2,830,963

PROCESS FOR MANUFACTURING ASPHALT-RUBBER BLENDS

Ralph N. Traxler and Clarence E. Wilkinson, Port Neches, Tex., assignors to The Texas Company, New York, N. Y., a corporation of Delaware Application September 1, 1954, Serial No. 453,573

5 Claims. (Cl. 260—28.5)

This invention relates to a process for preparing rubber-asphalt mixtures characterized by improved ductility and low temperature properties from asphalt and latices of synthetic rubber. More particularly, this invention sets forth processing conditions which must be observed in order to incorporate synthetic rubber latex in asphalt to yield asphalt-rubber blends of improved ductility and low temperature properties.

In recent years, considerable interest has centered in rubber-containing asphalt paving mixtures which have been reported to possess outstanding properties. These developments envisioned the incorporation of crumb rubber during the mixing of asphalt and aggregate. The trouble, time and labor required to incorporate rubber in asphalt during the mixing of asphalt and aggregate is one of the main reasons that asphalt-rubber roads of this type have never advanced beyond the stage of the laboratory and experimental test roads. In this invention, rubber is incorporated in asphalt at the asphalt plant, so that there are no additional manpower and time requirements at the site of mixing asphalt and aggregate. The process of the invention presents an unique and the first economically feasible approach to the problem of improving asphalt properties by incorporation of rubber therein.

In accordance with this invention, rubber which may be of the GRS type, polyisobutylene type, polybutadiene, or natural rubber is incorporated in asphalt in the form of a latex comprising 15 to 55 percent solids and 45 to 85 percent water with the resulting formation, after water removal, of an asphalt-rubber blend containing 1 to 3.5 weight percent rubber and having improved ductility and low temperature properties. The large water content of the latex poses severe problems which are solved by this invention. It has been found that it is necessary to observe certain critical conditions in blending rubber latex into asphalt to produce a rubber-containing asphalt of improved properties. The critical conditions which must be observed comprise a rubber concentration in the asphalt rubber blend between 1.0 and 3.5 weight percent, a temperature range between 275 and 375° F., substantial surface evaporation of the water content of the latex by adding it at a rate of 0.02 to 0.5 gallon per minute per square foot of surface in the mixing vessel, and maintenance of the asphalt viscosity below about 100 seconds Furol at the temperature of latex addition. When the foregoing critical conditions are observed, significant improvement in the ductility and low temperature properties of the asphalt are realized by the incorporation of the prescribed 1 to 3.5 weight percent rubber.

An outstanding advantage of the process of this invention is that substantial improvement in the properties of the asphalt is realized by the incorporation of a smaller percentage than used in prior art procedures. The incorporation of 5 percent or more rubber has been customary in prior art procedures in order to effect significant differences in the properties of the resulting asphalt-rubber blend. By incorporating rubber in asphalt in the form of its latex at the conditions prescribed in this invention, the improvement effected by the addition of 1 to 3.5 percent rubber is generally equivalent to, or better than, the improvement obtained by addition of 5 or more percent crumb rubber. It has been theorized that the attainment of improved asphalt properties with low rubber concentrations is attributable to the excellent dispersion of rubber through the asphalt which is realized in the process of the invention.

A second major advantage of the process of the invention is that the rubber is incorporated in the asphalt at its place of manufacture so that special equipment, extra manpower and excessive time are not required at each site of mixing asphalt and aggregate. Thus, substantial savings are possible by shipping the rubber-asphalt mixture as a blend rather than by separate shipping of asphalt and rubber for mixing at various points.

As indicated previously, the presence of 45 to 85 percent water in the rubber latex is the major cause of the necessity of using closely controlled conditions for the incorporation of the rubber in asphalt by the process of this invention. This large amount of water has to be removed from the asphalt-rubber blend without adversely affecting the properties of the rubber polymer and without causing violent spattering of the asphalt mixture during removal of the latex water as steam. Employing the reaction conditions prescribed in this invention, incorporation of a latex in hot asphalt and evaporation of the water component of the latex are smoothly accomplished without harmful degradation of the rubber component.

The rubber latex employed in the process of the invention is a GRS-type employing copolymerized butadiene and styrene, a polybutadiene type, a polyisobutylene, or a natural rubber type. The GRS-type rubber latices are preferred for use in the process of the invention with the cold GRS rubber being preferred over hot GRS rubber. The latices of these various type rubbers are stabilized with conventional materials such as sodium stearate, sodium oleate, sodium naphthenate, etc. The latices comprise 15 to 55 weight percent solids and 45 to 85 weight percent water. Emulsions containing a solids content higher than 55 percent are too unstable for use in the process of the invention. It has been found that emulsions containing between about 25 and 50 percent solids are most effective in the process of the invention.

Latices of standard cold GRS rubber having solids contents between 25 and 50 percent constitute one of the preferred latices for use in the invention. Another preferred product is a latex having a 50 percent solids content and containing butadiene-styrene rubber which has a Mooney value of 58, a molecular weight of approximately 240,000 and comprises about 77 weight percent butadiene and 23 weight percent styrene.

The asphalt employed in the process of this invention must comply with one important requirement, namely, that its Furol viscosity be 100 seconds or less at the temperature between 275 and 375° F. selected for addition of the latex to the asphalt. Best results are obtained when the asphalt had a viscosity of 50 to 90 SF seconds at the temperature of blending. The viscosity requirement of the asphalt is based upon the necessity of effecting sufficiently rapid circulation of the asphalt to spread rapidly the added latex over the asphalt surface and to provide additional surface for water evaporation by establishing a vortex. If the viscosity of the asphalt is above 100 seconds Furol at the temperature of addition, the asphalt is so viscous that added latex is not properly distributed but tends to concentrate in portions of the asphalt. As a consequence, with more viscous asphalts, it is not possible to obtain substantial improvement of the ductility and low temperature properties with amounts of added rubber in the range of 1 to 3.5 percent. In addition, with more viscous asphalts, the latex addition is accompanied by such severe spattering of the asphalt that it is necessary to stop the latex addition.

Vacuum-reduced asphalts are particularly preferred for use in the invention. The asphalt component is characterized as follows:

Ductilities, 5 cm./min. at 77° F., cm_____ 100–120
Penetrations at 77° F. (100 g. 5 seconds)_____ 50–120

At the 275 to 375° F. temperature range prescribed for addition of latex to the asphalt, the water content of the latex is substantially removed by means of surface vaporization without further polymerization of the butadiene-styrene rubber to resinous insoluble products which separate from the asphalt. At temperatures below 275° F., the asphalt does not have enough latent heat to effect rapid vaporization of the water content of the latex. As a consequence, water removal is slow, tedious and accompanied by the formation of a tough foam as the aqueous latex is stirred into the asphalt mass. At temperatures above the prescribed 375° F. upper limit, the butadiene-styrene component of the latex undergoes further polymerization to form a resinous insoluble product which separates from the asphalt. The preferred temperature range for incorporation of rubber in asphalt by means of an aqueous latex suspension is between 300 and 350° F. Removal of the water content of the latex must be effected substantially as a surface phenomenon in order to prevent uncontrolled spattering and foaming.

It has been discovered that rubber latex can be added to hot asphalt at a temperature within the prescribed 275 to 375° F. range at a commercially feasible rate by correlating latex addition with the asphalt surface area (quiescent condition) in the mixing vessel. Addition of latex at a rate of 0.02 to 0.5 gallon per minute per square foot of surface area of asphalt in the mixing vessel has been found to result in substantial vaporization of the water content of the latex on the surface of the stirred asphalt. Rates below the prescribed minimum of 0.02 gallon per minute per square foot of asphalt surface are impractical, while rates above the upper limit of 0.5 gallon per minute per square foot of asphalt cause a substantial amount of latex to be sucked into the mass of the asphalt with resulting excessive spattering and foaming. The preferred rate of addition falls within the limits of 0.07 and 0.4 gallon per minute per square foot of asphalt surface area.

The above prescribed rate of latex addition is illustrated by the addition of latex to asphalt in a vessel having a 4 foot inner diameter. The asphalt surface area in this vessel of this diameter is approximately 12.6 square feet. Excellent results were obtained by adding the latex at a rate of 0.8 to 1.5 gallons per minute, which falls within the prescribed range of 0.02 to 0.5 gallon per minute per square foot of asphalt surface area.

Excessive foaming and spattering of the asphalt during addition of the latex is also minimized by the incorporation of a suitable anti-foam agent such as a silicone polymer in the asphalt prior to the addition of the latex. The silicone polymer, which may be substituted by alkyl groups such as methyl, ethyl or isoamyl radicals, by aryl groups such as phenyl, tolyl or benzyl radicals, and by mixed alkyl-aryl groups, is used in very dilute concentration, e. g., 0.5 to 5 p. p. m. of asphalt. The use of the silicone polymer permits addition of the latex at rates in the higher portion of the specified 0.02 to 0.5 gallon per minute per square foot of asphalt surface area. A silicone polymer of high viscosity such as dimethylsilicone polymer having a kinematic viscosity at 25° C. of about 1,000 centistokes and above is preferably employed. A silicone polymer of this type is conveniently employed in the form of a concentrate in a hydrocarbon solvent such as kerosene. For example, a very satisfactory antifoam agent is prepared by diluting 10 cc. of dimethylsilicone polymer with kerosene to bring the volume up to 100 cc. This concentrate is ordinarily employed in an amount of about 0.00005 to 0.0005 percent by weight of the asphalt to give a concentration of about 0.5 to 5 p. p. m. of the silicone polymer.

Asphalt rubber blends of improved ductility and high temperature viscosity are realized by the incorporation of much smaller concentrations of rubber than has been previously thought feasible. The rubber concentration of the asphalt rubber blend is limited to a 1 to 3.5 weight percent range by the viscosity properties of the resulting blend. If more than 3.5 weight percent rubber is added to the asphalt by the process of this invention, the viscosity of the resulting asphalt rubber blend is so high that application temperatures of 400° F. or over are required. As indicated previously in discussing the temperature range prescribed for addition of the latex to the rubber, temperatures of 400° F. and above will destroy the rubber component of the blend. Apparently, the process of this invention results in such excellent distribution of the rubber throughout the asphalt-rubber blend that a substantial viscosity increase is attained with rubber concentrations well below the 5 to 7 percent rubber used in previous methods of incorporating rubber in asphalt. The lower concentration limit of 1 weight percent in the asphalt-rubber blend is the minimum required to exert a substantial improvement of ductility and high temperature viscosity properties. The preferred concentration of rubber lies between 1.5 and 2.5 weight percent.

The equipment used for incorporating rubber latex in asphalt comprises one or more vessels which are connected to a small tank equipped with an adequate mixer. Hot asphalt continuously circulates between the vessel and the small tank. The latex is added to the asphalt in the small tank as it is rapidly stirred. The water content of the latex is substantially evaporated on the surface of the asphalt in the small tank and the rubber stirred into the asphalt mass. Continuous circulation of the asphalt between the small mixing tank and the vessel results in complete homogeneity of the asphalt-rubber blend.

The foregoing equipment and the process of the invention are diagrammatically illustrated in the accompanying drawing.

Asphalt is introduced through line 1 into a vessel 2 wherein it is raised to a temperature falling within the prescribed 275 to 375° F. range. The vessel 2 is connected by line 5, pump 6 and line 7 with a mixing tank 8 equipped with a mixer 9.

Asphalt at the prescribed temperature, for example, about 300 or 325° F. is pumped from the vessel 2 to the mixer 8 wherein it is stirred sufficiently to establish a vortex. The SF viscosity of the asphalt at the temperature prevailing in the mixer 8 is less than 100 sec.

The rubber latex, which is stored in the tank 14 is introduced through pipe 15 into the mixer tank 8. The latex may be introduced by controlled gravity flow into the mixer but preferably a proportioning pump is used to give closer control of the rate of latex addition. The rate of latex addition to the asphalt is correlated with the surface area of the asphalt in the mixing tank at quiescent conditions and is between 0.02 and 0.5 gallon per minute per square foot of asphalt surface area in the mixing tank.

The asphalt is continuously pumped from the mixing tank 8 to the vessel 2 through pipes 17 and 18 and pump 19. During the addition of the latex, and for a period after addition is complete, the asphalt is continuously recirculated from the vessel 2 to the mixing tank 8 and back to the vessel 2.

The process of the invention is illustrated by the production of a plant batch of an asphalt-rubber mix which was employed in laying an experimental road in Texas.

EXAMPLE I

There was charged to a vessel, 181 barrels of a paving asphalt having the following characteristics:

| | |
|---|---|
| Soft. point, R. & B., ° F | 117 |
| Ductility, 77° F., cm | 185 |
| Ductility (5 cm), 39.2° F., cm | 6.5 |
| Penetration, 77° F | 97 |
| Penetration, 32° F | 29 |
| Viscosity, SF/300° F. sec | 103 |
| Flash, COC, ° F | 645 |

After the asphalt reached a temperature of about 300° F. in the vessel, circulation of the asphalt between the vessel and the mixing tank at a rate of 60 barrels per hour was started. The latex was added at an average rate of 1.25 gallons per minute to the asphalt which was stirred in the mixing vessel which had an internal diameter of about 4 feet. A dimethyl silicone concentrate comprising about 10 grams of dimethyl silicone in 100 cc. of kerosene solution was also added to the mixing vessel in small increments. The total amount of silicone concentrate added during entire operation was less than 5 p. p. m. of the total mixture. After all of the latex had been added, the temperature was raised to about 330° F. and the blend heated for an hour at that temperature. The mixture was then heated to about 370° F. while it was circulated at a rate of 150 barrels per hour. The rubber latex employed in this plant run had solids content of about 50 percent and a Mooney viscosity of 58, a molecular weight of approximately 240,000 and comprised about 77 weight percent butadiene and 23 weight percent styrene.

The properties of the asphalt-rubber blend prepared by the foregoing procedure, as well as the properties of asphalt-rubber blends employing different GRS rubber latices are shown in Table I. The properties of the base asphalt are included in this table for purposes of ready comparison.

*Table 1*

| Tests | Base Asphalt | Asphalt-Rubber Blends | | | | |
|---|---|---|---|---|---|---|
| | | A | B | C | D | E |
| Soft. Point, R. & B., °F | 117 | 119 | 125 | 126 | 124 | 126 |
| Ductility, 77° F , cm | 185 | 200+ | 35 | 200+ | 200+ | 200+ |
| Ductility (5 cm.), 39.2° F., cm | 6.5 | 200+ | 161 | 200+ | 200+ | 200+ |
| Penetration, 77° F | 97 | 95 | 86 | 84 | 85 | 82 |
| Penetration, 32° F | 29 | 27 | 28 | 27 | 26 | 29 |
| Viscosity, SF/300° F., sec | 103 | 116 | Gel | 209 | 195 | 206 |
| Flash, COC, °F | 645 | 615 | 565 | 595 | 560 | 555 |

Asphalt-rubber A in the previous table is that described in the previous example. Blend B contains 2 percent standard hot GRS rubber containing about 76.5 percent butadiene, 23.5 percent styrene and incorporated by means of a latex containing 50.4 percent solids. Blend C contains 2 weight percent standard cold GRS rubber comprising 76.5 percent butadiene, 23.5 percent styrene and incorporated by means of a latex comprising 26.4 percent solids. Blend D contains 2 percent cold GRS rubber comprising about 80 percent butadiene and 20 percent styrene and incorporated by means of a latex containing 49.2 percent solids. Blend E contains 2 percent standard cold GRS rubber used in Blend C and incorporated by means of a latex containing 26.3 percent solids.

This table clearly shows that asphalt-rubber blends containing 2 percent rubber are superior to asphalt alone in respect to ductility and susceptibility to temperature as measured by the softening point-penetration relationship. In general, the viscosities, SF/300° F., were almost double that of the asphalt, the softening points were raised and the penetration as 77° F. were lowered. The ductility at 77 and 39.2° F. for all of the asphalt-rubber blends containing cold GRS rubber were increased; with the hot GRS rubber the ductility at 77° F. was decreased but the ductility at 39.2° F. was increased. It is the anomalous effect of hot GRS rubber on ductility, which is the basis of characterizing cold GRS rubber as being preferred in the process of the invention.

The effect of adding 2 percent standard cold GRS rubber to two commercial paving asphalts sold by The Texas Company are shown in Tables 2 and 3 respectively.

*Table 2*

| | Asphalt A | Asphalt-Rubber Blend A |
|---|---|---|
| Softening Point, R. & B., °F | 117 | 124 |
| Ductility (5 cm.): | | |
| At 77° F | 200+ | 200+ |
| At 39.2° F | 5.7 | 100+ |
| Penetration: | | |
| At 77° F | 93 | 84 |
| At 32° F | 25 | 27 |

*Table 3*

| | Asphalt B | Asphalt-Rubber Blend B |
|---|---|---|
| Softening Point, R. & B., °F | 117 | 122 |
| Ductility (5 cm.): | | |
| At 77° F | 200+ | 200+ |
| At 39.2° F | 20.0 | 100+ |
| Penetration: | | |
| At 77° F | 100 | 90 |
| At 32° F | 21 | 21 |

In Tables 4 and 5 there are shown the properties of two plant batches of an asphalt-rubber mix which were employed in laying two experimental roads in Colorado. The rubber latex employed in the production of blend A of Table 1 was used in both preparations. 150 tons of asphalt-rubber blend were compounded in these preparations.

*Table 4*

| | Base Asphalt | Base Asphalt-Rubber Blend |
|---|---|---|
| Specific Gravity, 77° F | 1.026 | 1.025 |
| Softening Point, R. & B., °F | 115 | 117 |
| Ductility (5 cm./min.): | | |
| At 77° F., cm | 152 | 200+ |
| At 39.2° F., cm | 8.3 | 32.5 |
| Penetration: | | |
| At 77° F | 118 | 106 |
| At 32° F | 22 | 22 |

*Table 5*

| | Base Asphalt | Base Asphalt-Rubber Blend |
|---|---|---|
| Specific Gravity, 77° F | 1.027 | 1.026 |
| Softening Point, R. & B., °F | 113 | 115 |
| Ductility (5 cm./min.): | | |
| At 77° F., cm | 128 | 200+ |
| At 39.2° F., cm | 1.5 | 200+ |
| Penetration: | | |
| At 77° F | 113 | 115 |
| At 32° F | 22 | 25 |

The data in Tables 2 to 5 reinforce the conclusion reached from consideration of the data in Table 1, namely, that asphalt-rubber blends prepared by the process of the invention are superior to asphalt alone in respect to ductility and susceptibility to temperatures as measured by the softening point-penetration relationship. The realization of these improvements by small concentrations of rubber when incorporated by the process of the invention is a substantial advance in the art of asphalt-rubber compositions for road building.

Obviously, many modifications and variations of the invention as set forth above may be made without departing from the spirit and scope thereof and therefore only such limitations should be imposed as are indicated in the appended claims.

We claim:

1. In a process for preparing asphalt-rubber blends free of mineral aggregate, said blends being characterized by good ductility and low temperature properties, the improvement which comprises: maintaining a molten asphalt supply body for rubberizing at temperature between 275° and 375° F., the asphalt in said supply body having Seconds Furol viscosity less than 100 at said temperature; circulating an asphaltic stream from said supply body through an external mixing zone wherein asphaltic surface is exposed and back to said supply body; during the circulating period adding an aqueous suspension of rubber latex on to the exposed asphaltic surface in said mixing zone at rate between 0.02 and 0.5 gallon per minute of suspension per square foot of exposed asphalt area in said mixing zone, said suspension having solids concentration from 15–50% of rubber latex selected from the group consisting of a butadiene-styrene copolymer rubber, natural rubber, polyisobutylene rubber, and polybutadiene; terminating latex addition when the resulting asphalt-rubber blend contains between 1 and 3.5% rubber on a water-free basis; and continuing maintenance of temperature between 275° and 375° F. in said resulting asphalt-rubber blend at least until substantially all of the water has been removed therefrom.

2. The process according to claim 1 wherein the temperature of said supply body is maintained between 300 and 350° F., and the rate of rubber latex addition used is 0.07–0.4 gallon per minute per square foot of exposed asphaltic surface in said mixing zone.

3. A process according to claim 1 in which a butadiene-styrene copolymer cold rubber is used.

4. A process according to claim 1 in which addition of said rubber latex to said asphalt is effected in the presence of a liquid dihydrocarbon silicone polymer having antifoam properties.

5. A process according to claim 1 in which the asphalt component is a vacuum reduced material having a 100 to 120 cm. ductility (5 cm./min.) at 77° F., and a penetration at 77° F. of between 50 and 120.

References Cited in the file of this patent

UNITED STATES PATENTS

| | | |
|---|---|---|
| 1,758,913 | Sadtler | May 13, 1930 |
| 2,686,166 | Taylor | Aug. 10, 1954 |

FOREIGN PATENTS

| | | |
|---|---|---|
| 671,735 | Great Britain | May 7, 1952 |